United States Patent
Matthews et al.

(10) Patent No.: US 9,542,148 B2
(45) Date of Patent: Jan. 10, 2017

(54) ADAPTING A USER INTERFACE OF A REMOTE DESKTOP HOST

(75) Inventors: Michael Thano Matthews, Cary, NC (US); Scott Edwards Kelso, Cary, NC (US); Howard Locker, Cary, NC (US); Axel Ramirez Flores, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 255 days.

(21) Appl. No.: 13/216,828

(22) Filed: Aug. 24, 2011

(65) Prior Publication Data

US 2013/0055102 A1 Feb. 28, 2013

(51) Int. Cl.
*G06F 3/14* (2006.01)
*H04L 29/08* (2006.01)
*G06F 9/445* (2006.01)
*G06F 9/44* (2006.01)

(52) U.S. Cl.
CPC ......... *G06F 3/1454* (2013.01); *G06F 9/44505* (2013.01); *H04L 67/08* (2013.01); *G06F 9/4445* (2013.01); *G09G 2370/042* (2013.01); *G09G 2370/10* (2013.01)

(58) Field of Classification Search
CPC .................................. G06F 3/01; G06F 15/16
USPC ........................................................ 715/740
See application file for complete search history.

(56) References Cited

U.S. PATENT DOCUMENTS

| | | | | |
|---|---|---|---|---|
| 5,909,545 A * | 6/1999 | Frese, II | ............... | G06F 9/4445 709/208 |
| 7,136,940 B2 * | 11/2006 | Roh | ........................ | F25D 29/00 345/169 |
| 8,352,579 B2 * | 1/2013 | Mohr | .................. | H04L 41/0813 709/220 |
| 8,806,349 B2 * | 8/2014 | Hakoda | .................... | G06F 13/00 715/717 |
| 2004/0093379 A1 * | 5/2004 | Roh | ........................ | F25D 29/00 709/203 |
| 2009/0077363 A1 * | 3/2009 | Janzen | ................ | G06F 9/45537 713/1 |
| 2010/0045816 A1 * | 2/2010 | Rhoads | .................. | G06K 9/228 348/222.1 |
| 2010/0107113 A1 * | 4/2010 | Innes | .................. | G06F 9/44505 715/779 |
| 2010/0169535 A1 * | 7/2010 | Saxby | .................... | G06F 1/3209 710/316 |
| 2010/0268828 A1 * | 10/2010 | Pahlavan | ............... | G06F 9/4445 709/227 |
| 2011/0154465 A1 * | 6/2011 | Kuzin | ................. | H04L 63/0815 726/9 |

(Continued)

OTHER PUBLICATIONS

Splashtop Remote Desktop for iPad Review, Jul. 20, 2011.*
Remote Desktop to Your Windows Computer From Your iPhone, iPad, or iPod Touch (Aug. 26, 2010).*

*Primary Examiner* — David Choi
(74) *Attorney, Agent, or Firm* — Kunzler Law Group

(57) ABSTRACT

An apparatus and method are presented for adapting a user interface of a remote desktop host. The apparatus includes a processor, a memory, a detection module and an adaptation module. The detection module detects a remote desktop connection between a remote client and a host. The remote client and the host may have different user interface characteristics. The adaptation module adapts a user interface of the host to accommodate user interface characteristics of the remote client.

14 Claims, 7 Drawing Sheets

(56) References Cited

U.S. PATENT DOCUMENTS

| | | | | |
|---|---|---|---|---|
| 2011/0307614 A1* | 12/2011 | Bernardi | ............. | G06F 9/45533 709/227 |
| 2011/0315763 A1* | 12/2011 | Hochmuth | .............. | G06F 15/16 235/380 |
| 2012/0072849 A1* | 3/2012 | Hakoda | ................... | G06F 13/00 715/744 |
| 2012/0169593 A1* | 7/2012 | Mak | ...................... | G06F 3/0485 345/157 |
| 2012/0233549 A1* | 9/2012 | Ricci | ................ | H04M 1/72519 715/740 |
| 2012/0311471 A1* | 12/2012 | Bullard | ................... | G06F 3/048 715/765 |
| 2013/0031481 A1* | 1/2013 | Schreifels | ............ | G06F 9/4445 715/740 |
| 2013/0031482 A1* | 1/2013 | Saul | ..................... | G06F 3/0488 715/740 |
| 2013/0055102 A1* | 2/2013 | Matthews | ........... | G06F 9/44505 715/740 |

* cited by examiner

ADAPTING A USER INTERFACE OF A REMOTE DESKTOP HOST

BACKGROUND

Field

The subject matter disclosed herein relates to a remote desktop connection and more particularly relates adapting a user interface of a host to accommodate user interface characteristics of a remote client.

Description of the Related Art

The proliferation of portable computing devices, such as touch-sensitive devices, and split-system personal computer ("PC") architectures have led to more instances of remote desktop connections from these portable computing devices or tablet portions of split-system PCs, often with smaller screens and touch interfaces, to traditional remote PC hosts. The host PC's user interface typically employs a keyboard/mouse input paradigm with smaller on-screen objects scaled for larger PC display sizes.

Navigating a host PC using a remote desktop connection using a smaller client device may involve panning and zooming on the remote client to accommodate the host PC interface. This makes for a slow and inconvenient user experience.

BRIEF SUMMARY

Based on the foregoing discussion, the inventors have recognized a need for an apparatus and method for adapting a user interface of a remote desktop host. Beneficially, such an apparatus and method may adapt the user interface of the remote desktop host to accommodate user interface characteristics of a remote client.

The embodiments of the present disclosure have been developed in response to the present state of the art, and in particular, in response to the problems and needs in the art that have not yet been fully solved by currently available remote desktop hosts. Accordingly, the embodiments have been developed to provide an apparatus and method for adapting a user interface of a remote desktop host that overcome many or all of the above-discussed shortcomings in the art.

An apparatus is provided with a processor, a memory, and a plurality of modules configured to functionally execute the steps of detecting a remote desktop connection between a remote client and host and adapting a user interface of the host. These modules in at least a portion of the described embodiments include a detection module and an adaptation module.

In one embodiment, the detection module detects a remote desktop connection between a remote client and a host. The remote client and the host may have different user interface characteristics. In one embodiment, the adaptation module adapts a user interface of the host to accommodate user interface characteristics of the remote client.

A method is also presented and in the disclosed embodiments, the method substantially includes the steps to carry out the functions presented above with respect to the operation of the described apparatus. In one embodiment, the method includes detecting a remote desktop connection between a remote client and a host. The remote client and the host may have different user interface characteristics. In one embodiment, the method also includes adapting a user interface of the host to accommodate user interface characteristics of the remote client.

A computer program product is also presented. In one embodiment, the computer program product includes detecting a remote desktop connection between a remote client and a host. The remote client and the host may have different user interface characteristics. In one embodiment, the computer program product also includes adapting a user interface of the host to accommodate user interface characteristics of the remote client.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
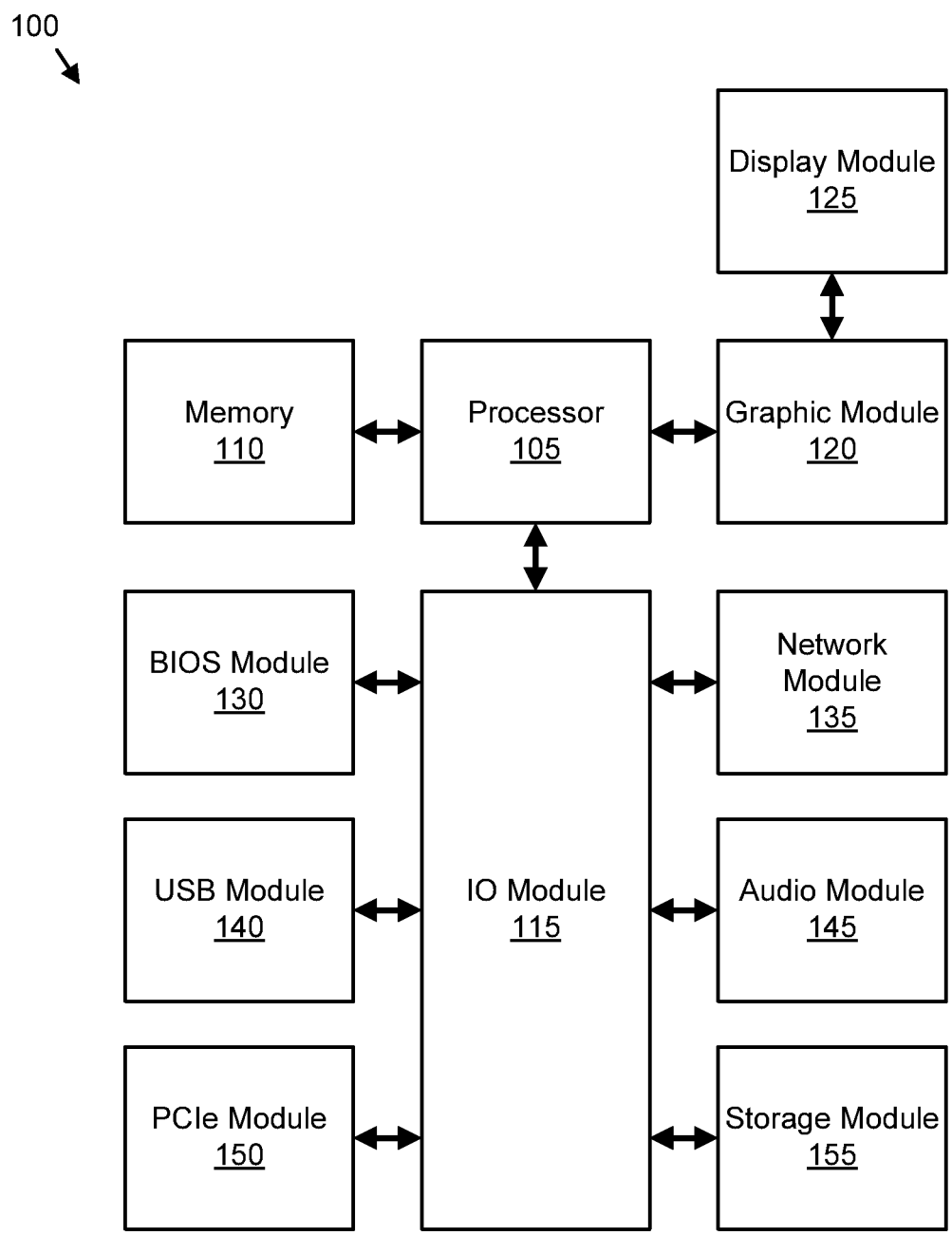
FIG. 1 is a schematic block diagram illustrating one embodiment of a computer system in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of a computer system 100. The computer system 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computer system 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computer system 100, so that computer readable software instructions stored on the storage module 155 can load, execute, and assume control of the computer system 100. Alternatively, the BIOS module 130 may comprise a coded program embedded on a chipset that recognizes and controls various devices that make up the computer system 100.

The network module 135 may communicate with the IO module 115 to allow the computer system 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
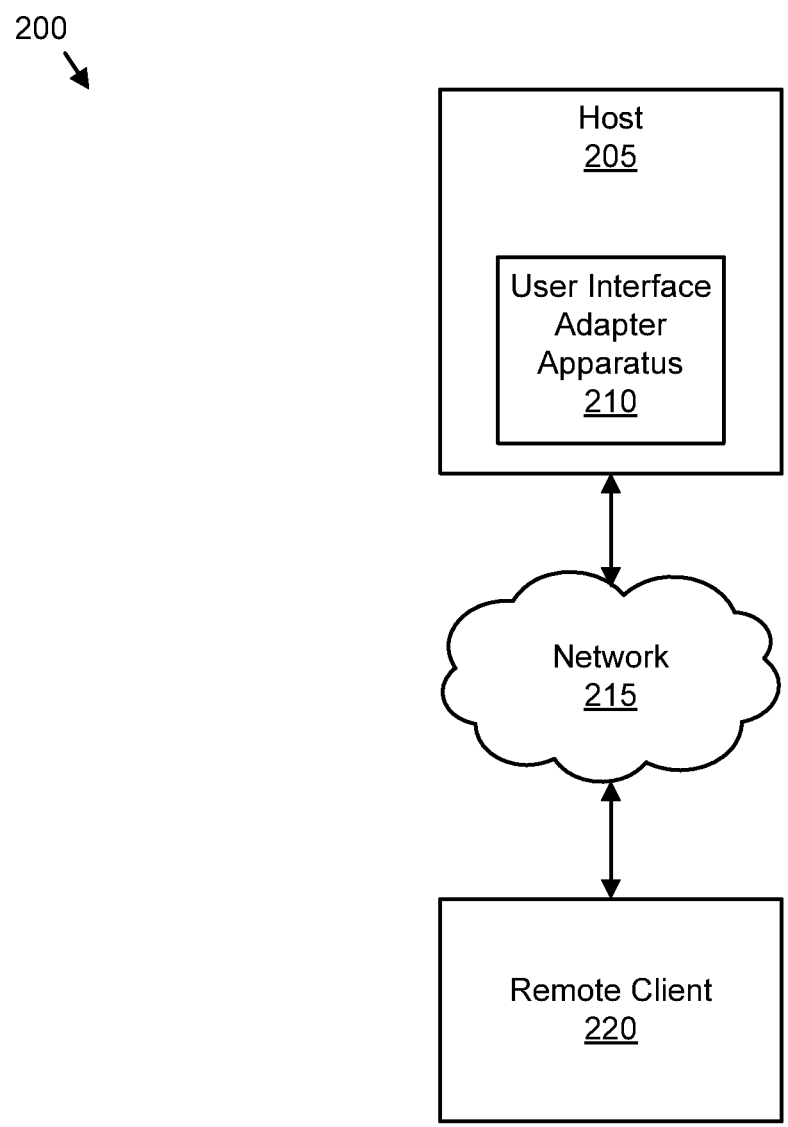
FIG. 2 is a schematic block diagram illustrating one embodiment of a system for adapting a user interface of a remote desktop host in accordance with the present subject matter.

FIG. 2 illustrates one embodiment of a system 200 for adapting a user interface of a remote desktop host. The system includes a host 205, a network 215, and a remote client 220. The host 205 may include a user interface adapter apparatus 210.

The host 205 may comprise a remote desktop host and may be embodied as an information handling device, a computing device, and/or the like. The host 205 may comprise one embodiment of the computer system 100 of FIG. 1 and/or may include at least a portion of the components of the computing system 100 in FIG. 1 including memory 110, a storage module 155 storing computer readable programs, and/or a processor 105 that executes the computer readable programs as is known to those skilled in the art. The host 205 may be embodied as a desktop computer, a server, a portable computer, a tablet computer, and the like.

The host 205 may be configured to communicate with the remote client 220 and provide a graphical interface to the remote client 220 to access the host 205 during a remote desktop session by way of a remote desktop connection. The remote desktop connection may allow applications, such as graphical applications, to be run remotely on a host 205, while being displayed on a remote client 220 during the remote desktop session. The remote desktop connection may allow the remote client 220 to attach to and/or control the host's 205 login session.

In one embodiment, the host 205 executes an operating system and/or application that provides, is integrated with, and/or executes applications for host 205 remote desktop capabilities. In one embodiment, the remote desktop connection is a remote desktop connection according to the Remote Desktop Protocol ("RDP") from MICROSOFT®. In other embodiments, the host 205 may use any suitable remote desktop applications and/or protocols to provide the remote desktop connection.

The network 215 may be embodied as a global communications network such as the Internet, a Local Area Network ("LAN"), multiple LANs communicating over the internet, a Wireless Local Area Network ("WLAN"), or any other suitable communications network. In one embodiment, the network 215 is a Network Driver Interface Specification ("NDIS") compliant network. In a certain embodiment, the network 215 is a Remote NDIS ("RNDIS") network.

The remote client 220 may comprise a remote desktop client and may be embodied as an information handling device, a computing device, and/or the like. The remote client 220 may comprise one embodiment of the computer system 100 of FIG. 1 and/or may include at least a portion of the components of the computer system 100 in FIG. 1 including memory 110, a storage module 155 storing computer readable programs, and/or a processor 105 that executes the computer readable programs as is known to those skilled in the art. The remote client 220 may be embodied as a portable or handheld electronic/computing device such as a personal desktop assistant ("PDA"), a tablet computer, a slate or pad computer, an e-Book reader, a mobile phone, a Smartphone, and the like. In other embodiments, the remote client 220 may be embodied as a desktop computer, a portable computer, a server, a mainframe computer, and/or the like.

The remote client 220 may be configured to communicate with the host 205 by way of a remote desktop connection with a remote desktop session as described above. The remote desktop connection may allow the remote client 220 to run applications on the host 205. In one embodiment, the remote client 220 executes an operating system and/or application that provides, is integrated with, and/or executes applications for remote client capabilities.

In one embodiment, the remote client 220 and the host 205 have different user interface characteristics. In certain embodiments, the remote client 220 is a portable or handheld electronic/computing device with a smaller display in relation to the host 205. In one embodiment, the user interface of the remote client 220 is a touch-sensitive user interface and the user interface of the host 205 is configured for keyboard/mouse input paradigm with smaller on-screen objects scaled for larger PC display sizes.

Navigating and interacting with the host 205 user interface with the remote client 220 interface may cause the user to panning and zooming on the remote client 220. Therefore, the host 205 includes a user interface adapter apparatus 210. The user adapter apparatus may adapt a user interface of the host 205 to accommodate user interface characteristics of the remote client 220 for the remote desktop connection between the remote client 220 and the host 205 during a remote desktop session. The user interface adapter apparatus 210 may determine user interface/device characteristics of the remote client 220 and adapt the user interface characteristics of the host 205 accordingly during the remote desktop session. The user interface adapter apparatus 210 may adapt screen resolution, text size, icon size, input field size, menu configuration, and the like, of the host 205 such that the user, on the remote client 220, may more easily interact with the host 205 over the remote desktop connection.

The user interface adapter apparatus 210 may reside in or be in communication with the host 205. All or a portion of the user interface adapter apparatus 210 may be stored on memory and executed by a processor (e.g. of the host 205) and/or may be implemented as logic hardware. Furthermore, the user interface adapter apparatus 210 may, in one embodiment, communicate with and/or be integrated with remote desktop applications, drivers, and the like.

Figure 3:
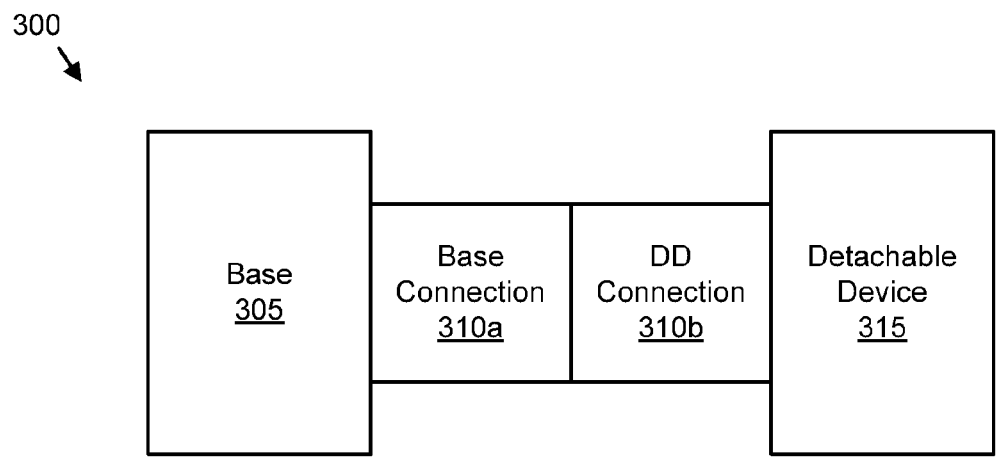
FIG. 3 is a schematic block diagram illustrating one embodiment of a computing system in accordance with the present subject matter.

FIG. 3 is a schematic block diagram illustrating one embodiment of a computer system 300. The computer system 3 includes a base 305 and a detachable device 315. The base 305 connects to the detachable device 315 through connection 310 comprising a base connection 310a and a detachable device connection 310b. In one embodiment, the base connection 310a and the detachable device connection 310b are Universal Serial Bus (USB) connections. Alternatively, the base connection 310a and the detachable device connection 310b may be Institute of Electrical and Electronic Engineers (IEEE) 1394 interface (1394) connections, High-Definition, Multimedia Interface (HDMI) connections, custom serial bus connections, custom parallel bus connections, or the like.

In one embodiment, the detachable device 315 provides a display for the base 305 if the detachable device 315 and the base 305 are connected. In addition, the detachable device 315 may provide other functionality for the base 305. In a certain embodiment, the detachable device 315 provides a network connection. The base 305 may provide additional resources for use with the detachable device. For example, the base 305 may include a mass storage device such as a hard disk drive, a micromechanical storage device, and optical storage device, a holographic storage device, and the like. The base 305 may also provide additional input devices such as a keyboard, a mouse, a joystick, a game controller, and the like. In one embodiment, the base 105 includes additional I/O ports such as USB ports, 1394 ports, HDMI ports, external power supply ports, and the like.

In one embodiment, both the base 305 and the detachable device 315 include power sources such as batteries, fuel cells, and the like. In one embodiment, a power source of the base 305 may provide power to the detachable device 315 from a base power source when the base 305 and the detachable device 315 are connected. The detachable device 315 may use a device power source for power when disconnected from the base 305.

The base 305 may monitor the connection 310 between the base 305 and the detachable device 315. In addition, the detachable device 315 may also monitor the connection 310 between the base 305 and the detachable device 315. Thus the detachable device 315 may be aware of a connection event such as the detachable device 315 disconnecting from the base 305 and the detachable device 315 connecting to the base 305. The base 305 may also be aware of each connection event. In one embodiment, the detachable device 315 and/or base 305 may include a coupled connection sensor. For example, the connection sensor may be coupled to the base connection 310a and/or the detachable device connection 310b. Consequently, in one embodiment, the base 305 and/or the detachable device 315 may detect a connection event by way of the connection sensor. The connection sensor may be embodied as a mechanical switch, a sensor (e.g. a magnetic or capacitive sensor), electrical contacts between the base 305 and the detachable device 315, and/or the like.

Figure 4:
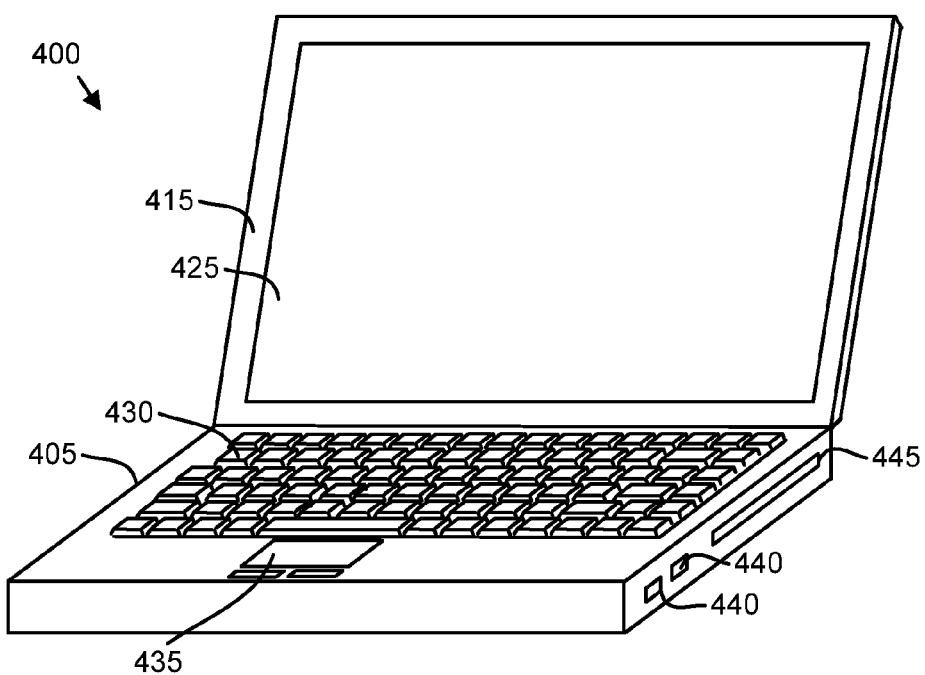
FIG. 4 is a perspective drawing illustrating one embodiment of a computing system in accordance with the present subject matter.

FIG. 4 is a perspective drawing illustrating one embodiment of a computer system 400. The computer system 400 illustrates one embodiment of the computer system 300 of FIG. 3. In one embodiment, the computer system 400 is U1 hybrid notebook produced by Lenovo.

The computer system 400 includes a base 405 and a detachable device 415. The base 405 may be the base 305 of FIG. 3. In addition, the detachable device 415 may be the detachable device 315 of FIG. 3. The detachable device 415 is shown connected to the base 405. In the depicted embodiment, the base 405 includes a keyboard 430, a touchpad 435, I/O connections 440, and an optical drive 445. The I/O connections 440 may be USB connections, 1394 connections, HDMI connections, or the like.

When the detachable device 415 is connected to the base 405, the detachable device 415 may provide a display 425 for the base 405. In one embodiment, both the base 405 and the detachable device 415 include power sources such as batteries, fuel cells, and the like. In one embodiment, a power source of the base 405 may provide power to the detachable device 415 when the base 405 and the detachable device 415 are connected. Alternatively, both the power source of the base 405 and the power source of the detachable device 415 may be used concurrently.

Referring also to FIG. 1, both the detachable device and base may each include one or more of a processor 105, a memory 110, a graphics module 120, a USB module 140, and a storage module 155. In one embodiment, a USB module 140 on the base may be the base connection 310a of FIG. 3 and a USB module on the detachable device may be the detachable device connection 310b of FIG. 3. The base 405 and detachable device 415 may communicate through their respective USB modules.

In one embodiment, the detachable device 415 includes a display module 125 and the base 405 does not include a display module 125. When the detachable device 415 is connected to the base 405, a graphic module 120 on the base may communicate with the display module 125 on the detachable device 415 through the USB modules 140 of the base 405 and detachable device 415. Thus the graphic module 120 on the base may drive the display 425 and receive inputs from the display 425. In one embodiment, the processor 105 on the detachable device 415 issues display commands and displays data to the graphic module 120 on the detachable device 415, which may render data for the display module 125 on the base 405.

In one embodiment, the detachable device 415 includes a network connection. The network connection may communicate with a network. In one embodiment, the network is a Network Driver Interface Specification ("NDIS") compliant network. In a certain embodiment, the network is a Remote NDIS ("RNDIS") network. In an alternate embodiment the network is a Wireless WAN. The base 405 may communicate with the network through the network connection via the USB modules 140 of the base 405 and detachable device 415.

In one embodiment, an instruction set of the processor 105 on the base 405 ("base processor") is incompatible with an instruction set of the processor 105 of the detachable device 415 ("detachable device processor"). The base processor may be based on an X86 instruction set and the detachable device processor may be based on an ARM instruction set. In one embodiment, the base processor and the detachable device processor may each execute a separate operating system. The base processor may execute a first operating system. The first operating system may be a personal computer operating system such as a MICROSOFT WINDOWS® compatible operating system, an APPLE MACINTOSH® compatible operating system, a Linux compatible operating system, or the like. The detachable device processor may execute a second operating system. The second operating system may be a cellular telephone operating system such as an operating system based on the ANDROID® Platform Architecture, a MICROSOFT WINDOWS® compatible mobile operating system, or the like.

Figure 5:
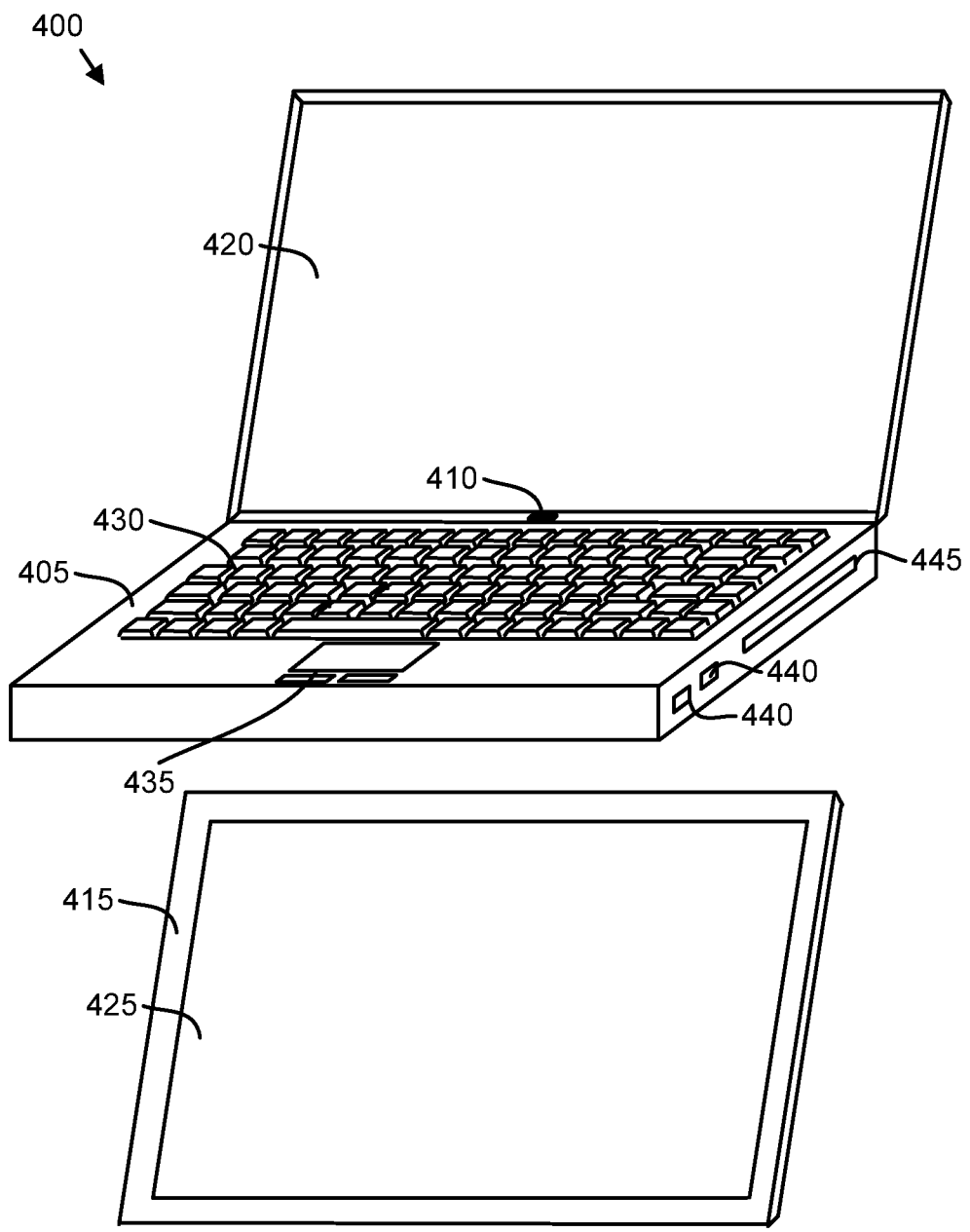
FIG. 5 is a perspective drawing illustrating one embodiment of a computing system in accordance with the present subject matter.

FIG. 5 is a perspective drawing illustrating one embodiment of the computer system 400 of FIG. 4. The computer system 400 of FIG. 5 is shown with the detachable device 415 disconnected from the base 405. In one embodiment, the detachable device 415 connects to the base 405 through a connector 410. The description of the computer system 400 refers to elements of FIG. 4, like numbers referring to like elements.

The connector 410 may be a USB connection. In an alternate embodiment, the connector 410 employs USB compliant signals through a custom connector. In addition, the connector may be a 1394 connector, a HDMI connector, and the like. In a certain embodiment, the connector 410 employs a custom interface. When the detachable device 415 is connected to the base 405, a support 420 may support the physical connection between the base 405 and a detachable device 415.

In one embodiment, the detachable device 415 may act as a remote client 220 and the base 405 may act as the host 205 and the detachable device 415 may communicate with, control, and/or access the host 205 by way of a remote desktop connection as described above in relation to FIG. 2. In one embodiment, the detachable device 415 and/or base 405 may initiate a remote desktop session in response to the detachable device 415 disconnecting from the base 405.

Figure 6:
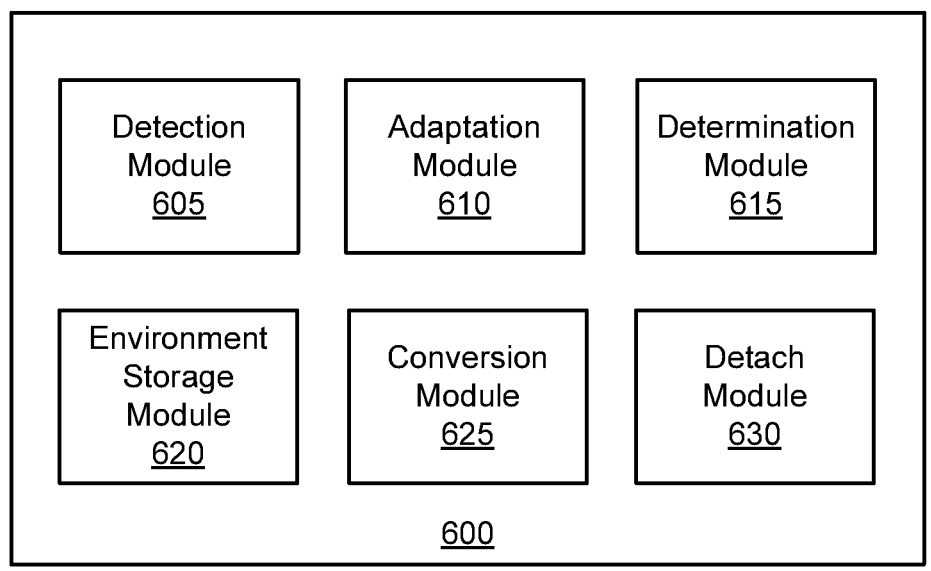
FIG. 6 is a schematic block diagram illustrating one embodiment of an apparatus for adapting a user interface of a remote desktop host in accordance with the present subject matter.

FIG. 6 illustrates one embodiment of an apparatus 600 for adapting a user interface of a remote desktop host. The apparatus 600 may comprise one embodiment of the user interface adapter apparatus 210 depicted in FIG. 2. The description of the apparatus 600 refers to elements of FIGS. 1-5, like numbers referring to like elements. The apparatus 600 includes one or more of a detection module 605, an adaptation module 610, a determination module 615, an environment storage module 620, a conversion module 625, and a detach module 630.

The detection module 605 detects a remote desktop connection and/or remote desktop session between the remote client 220 and the host 205. The remote client 220 and the host 205 may have different user interface characteristics. User interface characteristics may include, but are not limited to screen resolution, text size, icon size, input field size, menu configuration, interaction method (e.g. touch input vs. keyboard and mouse input), and the like. In one embodiment, the remote client 220 is a touch device having user interface characteristics configured for a touch-sensitive interface. In one embodiment, the host 205 has user interface characteristics configured for keyboard and mouse input (e.g. at least at a point in time in which the remote desktop session is initiated). As described above, the remote desktop connection may be a remote desktop connection according to the RDP protocol from MICROSOFT®. In other embodiments, the host 205 may use any suitable remote desktop applications and/or protocols to provide the remote desktop connection. In one embodiment, the remote desktop connection substantially persists user interface characteristics of the host 205 to the user interface of the remote client 220 (e.g. screen size and resolution, icon size, and the like, of the host 205 would persist to the client in the remote desktop interface of the client) during the remote desktop session.

In one embodiment, the detection module 605 detects the remote desktop connection between the remote client 220 and the host 205 by detecting the remote client 220 request a remote desktop connection, detecting the host 205 initiate a remote desktop connection, and the like.

In one embodiment, the remote client 220 comprises a detachable device 415 and the host 205 comprises a base 405 as described above in relation to FIGS. 3-5. In a further embodiment, the detection module 605 detecting the remote desktop connection includes the detection module 605 detecting the remote desktop connection between the remote client 220 and the host 205 in response to the detach module 630 detecting the detachable device detach 415 from the base 405. In one embodiment, the remote client 220 (the detachable device 415) may detect the detachable device detach 415 from the base 405 and, in response, initiate a remote desktop connection to the host 205 (the base 405).

The adaptation module 610 adapts a user interface of the host 205 to accommodate user interface characteristics of the remote client 220. In one embodiment, the adaptation module 610 adapts the user interface of the host 205 by changing screen resolution of the host 205, text size of the host 205, icon size of the host 205, input field size of the host 205, menu configuration of the host 205, and/or other applicable user interface characteristics. In one embodiment, the adaptation module 610 enables touch-sensitive input on the host 205 to accommodate a remote client 220 with a touch-sensitive user interface. The user interface of the host 205 may include a user interface as part of a host operating system and/or an application executing on the host 205. The adaptation module 610 may change a current user interface of the host 205. In another embodiment, the adaptation module 610 adapts the user interface of the host 205 by providing an alternate user interface from a stored user interface environment for use during remote desktop sessions.

The alternate user interface may exist as a secondary environment on the host 205 and may be implemented as an operating system shell, a program, other suitable scheme that allows on-screen objects on the host 205 to be represented, and their functions to be manipulated effectively, by the available user interface on the remote during a remote desktop session. The alternate user interface on the host 205 may employ larger icons, different screen pages or nesting schemes, reduced text or input fields, drop-down menus, and the like.

In one embodiment, the adaptation module 610 returns the user interface of the host 205 to a former user interface (e.g. before the adaptation module 610 previously adapted the user interface) in response to detecting the remote desktop session end.

The determination module 615 determines the user interface characteristics of the remote client 220. In one embodiment, the determination module 615 determines the user interface characteristics of the remote client 220 by receiving a message from the remote client 220 specifying the user interface characteristics of the remote client 220. This message may be associated with a remote desktop initiation and/or remote desktop login process. For example, as part of a request for a remote desktop connection, the remote client 220 may transmit its user interface characteristics, model number or other device identifier, USB device classes, and the like.

The environment storage module 620 stores one or more user interface environments. Each user interface environment may accommodate user interface characteristics of a particular remote client 220. The adaptation module 610 may adapt the user interface of the host 205 by selecting and loading a particular user interface environment from the stored user interface environments corresponding to the remote client 220 and/or characteristics of the remote client 220.

The conversion module 625 persists, transfers, and or converts touch input from the remote client 220 to user interface commands on the host 205. In certain embodiments, the host 205 may support a touch-sensitive interface and the conversion module 625 transfers touch input from the remote client 220 to the host 205. In one embodiment, the host 205 supports a touch-sensitive interface that is disabled. In this embodiment, the conversion module 625 may activate the touch-sensitive features on the host 205 during the remote desktop session.

The detach module 630 detects the detachable device 415 detach from the base 405. The detection module 605 may detect the remote desktop connection in response to the detach module 630 detecting the detachable device 415 detach from the base 405. In one embodiment, the detach module 630 detects the detachable device 415 detach from the base 405 by way of the connection sensor described above.

Figure 7:
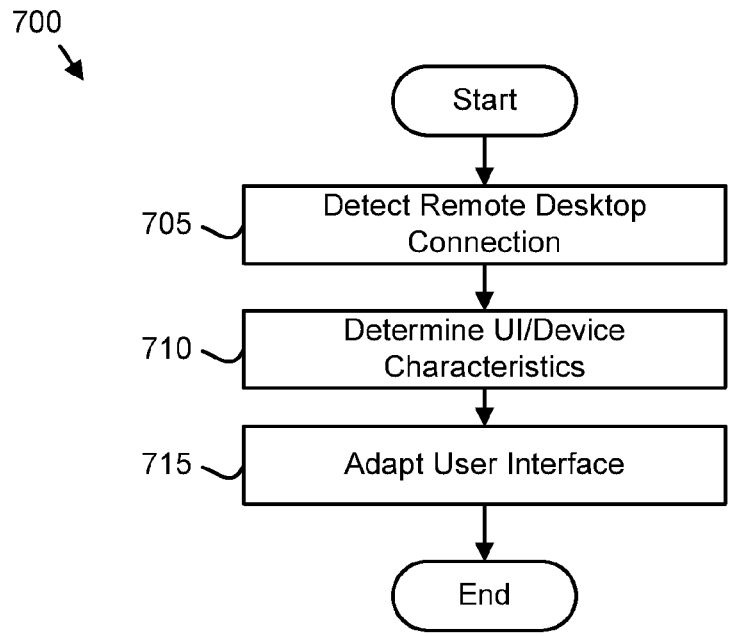
FIG. 7 is a schematic flow chart diagram illustrating one embodiment of a method for adapting a user interface of a remote desktop host in accordance with the present subject matter.

FIG. 7 illustrates one embodiment of a method 700 for adapting a user interface of a remote desktop host. The method 700 may implement at least a portion of the functions of the apparatus 600 of FIG. 6. The description of the method 700 refers to elements of FIGS. 1-6, like numbers referring to like elements.

The method 700 begins and the detection module 605 detects 705 a remote desktop connection between a remote client 220 and a host 205. The remote client 220 and the host 205 have different user interface characteristics. In one embodiment, the remote client 220 is a touch device having user interface characteristics configured for a touch-sensitive interface. Next, the determination module 615 determines 710 user interface characteristics and/or device characteristics of the remote client 220. The determination module 615 may receive a message from the remote client 220 specifying the user interface characteristics of the remote client 220. In one embodiment, the determination module 615 may determine a user interface/device type of the remote client 220 and retrieve stored user interface characteristics corresponding to that user interface/device type. Then, the adaptation module 610 adapts 715 a user interface of the host 205 to accommodate user interface characteristics of the remote client 220. Then, the method 700 ends.

Figure 8:
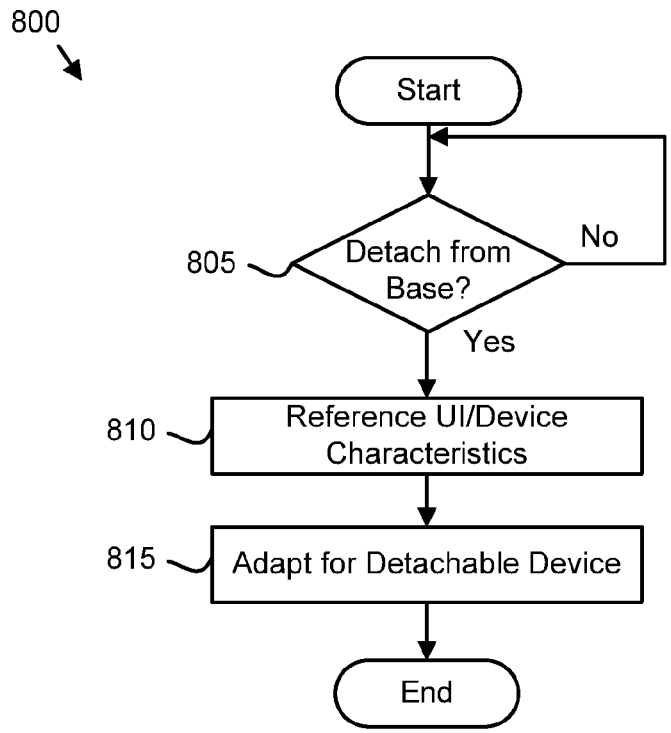
FIG. 8 is a schematic flow chart diagram illustrating another embodiment of a method for adapting a user interface of a remote desktop host in accordance with the present subject matter.

FIG. 8 illustrates another embodiment of a method 800 for adapting a user interface of a remote desktop host. The method 800 may implement at least a portion of functions of the apparatus 600 of FIG. 6. The description of the method 800 refers to elements of FIGS. 1-6, like numbers referring to like elements.

The method 800 begins and if the detach module 630 detects 805 a detachable device 415 detach from a base 405, the determination module 615 references 810 user-interface characteristics and/or device characteristics of the detachable device 415. In one embodiment, the detection module 605 may detect a remote desktop connection between the detachable device 415 and base 405 in response to the detach module 630 detecting the detachable device 415 detach from the base 405. Next, the adaptation module 610 adapts 815 a user interface of the base 405 to accommodate user interface characteristics of the detachable device 415 and the method 800 ends.

Figure 9:
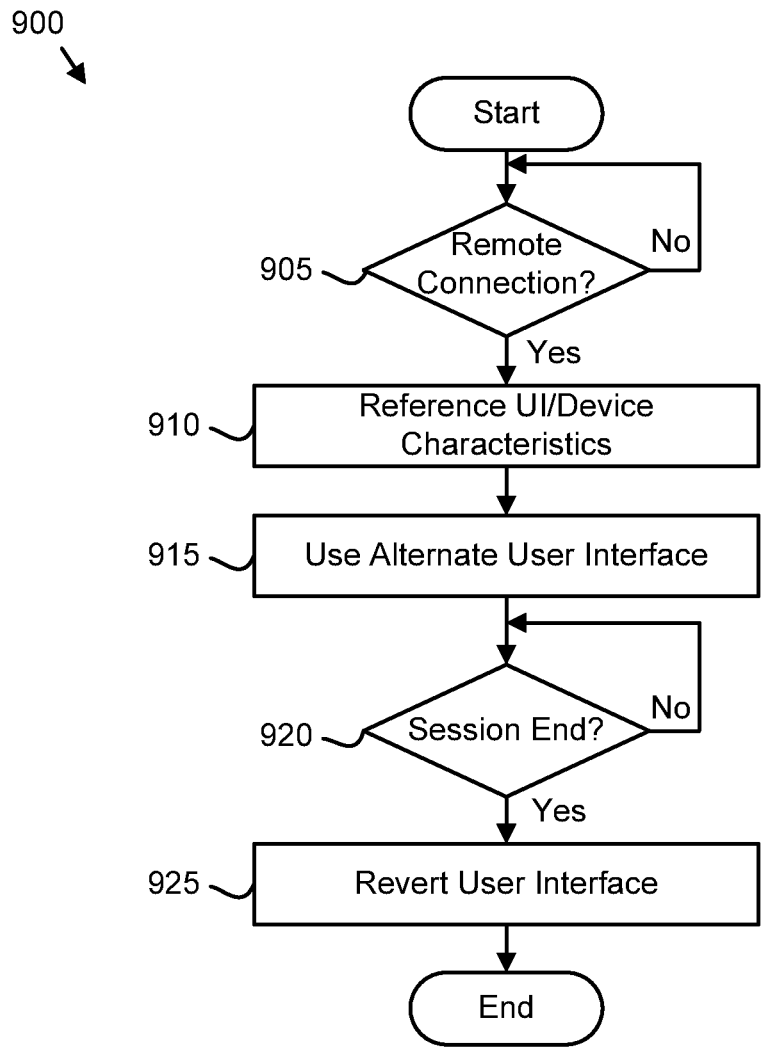
FIG. 9 is a detailed schematic flow chart diagram illustrating another embodiment of a method for adapting a user interface of a remote desktop host in accordance with the present subject matter.

FIG. 9 illustrates another embodiment of a method 900 for adapting a user interface of a remote desktop host. The method 900 may implement at least a portion of functions of the apparatus 600 of FIG. 6. The description of the method 900 refers to elements of FIGS. 1-6, like numbers referring to like elements.

The method 900 begins and if the detection module 605 detects 905 a remote desktop connection between a remote client 220 and a host 205, the determination module 615 references 910 user-interface characteristics, device characteristics, and/or a device identifier of the remote client 220. Next, the adaptation module 610 adapts 815 a user interface by providing the host 205 with an alternate user interface corresponding to the remote client 205 and/or accommodating the remote client 220. When the adaptation module 610 detects 920 the remote desktop session end, the adaptation module reverts 925 to the original user interface of the host 205 and the method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory storing modules for execution by the processor, comprising:
a detection module detecting a remote desktop connection between a remote client and a host, the remote client user interface and the host user interface having different user interface characteristics;
an environment storage module storing a plurality of user interface environments on the host for use on the host as the host's user interface, the plurality of user interface environments comprising a plurality of client user interfaces adapted from the host user interface, each client user interface accommodating user interface characteristics of a particular remote client and used on the host as the host's user interface;
a conversion module activating disabled touch sensitive features on the host during the remote desktop session in response to the remote client user interface having a touch-sensitive user interface;
an adaptation module adapting the host user interface to accommodate the user interface characteristics of the remote client user interface, wherein the adaptation module adapting a user interface of the host to accommodate user interface characteristics of the remote client user interface comprises selecting and loading a user interface environment from the plurality of stored user interface environments accessible to the host that correspond to the remote client for use on the host; and
a determination module determining the user interface characteristics of the remote client user interface and receiving a message from the remote client specifying the user interface characteristics of the remote client user interface, the message associated with a remote desktop initiation.

2. The apparatus of claim 1, wherein the remote client comprises a touch device having user interface characteristics configured for a touch-sensitive interface.

3. The apparatus of claim 1, wherein the adaptation module adapting the host user interface to accommodate user interface characteristics of the remote client user interface further comprises the adaptation module changing one or more of screen resolution, text size, icon size, input field size and menu configuration of the host.

4. The apparatus of claim 1, the conversion module further converting touch input from the remote client to user interface commands on the host.

5. The apparatus of claim 1, wherein the remote client comprises a detachable device and the host comprises a base, the detachable device providing a display for the base if the base and detachable device are connected.

6. The apparatus of claim 5, further comprising a detach module detecting the detachable device detach from the base wherein the detection module detecting the remote desktop connection further comprises the detection module detecting the remote desktop connection between the remote client and the host in response to the detach module detecting the detachable device detach from the base.

7. A method comprising:
detecting a remote desktop connection between a remote client and a host, the remote client user interface and the host user interface having different user interface characteristics;

storing a plurality of user interface environments on the host for use on the host as the host's user interface, the plurality of user interface environments comprising a plurality of client user interfaces adapted from the host user interface, each client user interface accommodating user interface characteristics of a particular remote client and used on the host as the host's user interface;

activating disabled touch sensitive features on the host during the remote desktop session in response to the remote client user interface having a touch-sensitive user interface;

adapting the host user interface to accommodate the user interface characteristics of the remote client user interface, wherein the adaptation module adapting a user interface of the host to accommodate user interface characteristics of the remote client user interface comprises selecting and loading a user interface environment from the plurality of stored user interface environments accessible to the host that correspond to the remote client for use on the host; and determining the user interface characteristics of the remote client user interface and receiving a message from the remote client specifying the user interface characteristics of the remote client user interface, the message associated with a remote desktop initiation.

8. The method of claim 7, wherein the remote client comprises a touch device having user interface characteristics configured for a touch-sensitive interface.

9. The method of claim 7, wherein adapting the host user interface to accommodate user interface characteristics of the remote client user interface further comprises changing one or more of screen resolution, text size, icon size, input field size and menu configuration of the host.

10. The method of claim 7, further comprising converting touch input from the remote client to user interface commands on the host.

11. The method of claim 7, wherein the remote client comprises a detachable device and the host comprises a base, the detachable device providing a display and a network connection for the base if the base and detachable device are connected, the method further comprising detecting the detachable device detach from the base wherein detecting the remote desktop connection further comprises detecting the remote desktop connection between the remote client and the host in response to detecting the detachable device detach from the base.

12. A computer program product comprising a non-transitory storage medium storing machine readable code executed by a processor to perform the operations of:

detecting a remote desktop connection between a remote client and a host, the remote client user interface and the host user interface having different user interface characteristics;

storing a plurality of user interface environments on the host for use on the host as the host's user interface, the plurality of user interface environments comprising a plurality of client user interfaces adapted from the host user interface, each client user interface accommodating user interface characteristics of a particular remote client and used on the host as the host's user interface;

activating disabled touch sensitive features on the host during the remote desktop session in response to the remote client user interface having a touch-sensitive user interface;

adapting the host user interface to accommodate the user interface characteristics of the remote client user interface, wherein the adaptation module adapting a user interface of the host to accommodate user interface characteristics of the remote client user interface comprises selecting and loading a user interface environment from the plurality of stored user interface environments accessible to the host that correspond to the remote client for use on the host; and determining the user interface characteristics of the remote client user interface and receiving a message from the remote client specifying the user interface characteristics of the remote client user interface, the message associated with a remote desktop initiation.

13. The computer program product of claim 12, wherein the remote client comprises a touch device having user interface characteristics configured for a touch-sensitive interface.

14. The computer program product of claim 12, wherein the remote client comprises a detachable device and the host comprises a base, the detachable device providing a display and a network connection for the base if the base and detachable device are connected, the computer program product further comprising detecting the detachable device detach from the base wherein detecting the remote desktop connection further comprises detecting the remote desktop connection between the remote client and the host in response to detecting the detachable device detach from the base.

* * * * *